United States Patent [19]

Sangeeta

[11] Patent Number: 5,685,917
[45] Date of Patent: Nov. 11, 1997

[54] METHOD FOR CLEANING CRACKS AND SURFACES OF AIRFOILS

[75] Inventor: D. Sangeeta, Niskayuna, N.Y.

[73] Assignee: General Electric Company, Schenectady, N.Y.

[21] Appl. No.: 578,802

[22] Filed: Dec. 26, 1995

[51] Int. Cl.$^6$ ....................................... B08B 3/10
[52] U.S. Cl. ............... 134/2; 134/19; 134/22.13; 134/22.14; 134/29; 164/132
[58] Field of Search ............... 134/2, 19, 22.13, 134/22.14, 22.19, 29; 164/132; 216/101; 252/79.1

[56] References Cited

U.S. PATENT DOCUMENTS

| | | | |
|---|---|---|---|
| 3,502,503 | 3/1970 | Bartlo | 134/2 |
| 3,553,015 | 1/1971 | Dohogne | 134/2 |
| 4,317,685 | 3/1982 | Ahuja et al. | 134/2 |
| 4,439,241 | 3/1984 | Ault et al. | 134/22.17 |
| 4,713,120 | 12/1987 | Hodgens, II et al. | 134/22.19 X |
| 5,464,479 | 11/1995 | Kenton et al. | 134/1 X |

OTHER PUBLICATIONS

"Metal Cleaning" Bibliographical Abstracts—1842–1951 by J.C. Harris, pp. 41 &98.

*Primary Examiner*—Jill Warden
*Assistant Examiner*—Saeed Chaudhry
*Attorney, Agent, or Firm*—Noreen C. Johnson; William H. Pittman

[57] ABSTRACT

The invention is a process for removing oxides, dirt, and organic impurities during repair of airfoils without damaging or effecting surface bond coats or base metal substrates of the airfoils. The process is especially suited for cleaning deep, tortuous cracks in the airfoils prior to brazing or alloying repair operations. The process entails using an autoclave with an organic caustic solution to fully remove the unwanted oxides, dirt, and organic impurities.

7 Claims, 1 Drawing Sheet

METHOD FOR CLEANING CRACKS AND SURFACES OF AIRFOILS

FIELD OF THE INVENTION

This invention pertains to the cleaning of airfoils during repair operations. More particularly, the invention is related to the removal of oxides, organic impurities, and dirt on the surfaces of airfoils by processing airfoils in an autoclave with an organic caustic solution.

BACKGROUND OF THE INVENTION

During the service use of turbine engine parts or airfoils, various modes of damage can occur. The engine parts are highly susceptible to damage from erosion, oxidation, and attack from environmental contaminants. Examples of turbine parts that often need to be repaired due to damage are blades, buckets, nozzles, combustion chamber liners, vanes, and the like.

As stated, one type of damage to engine parts occurs from the environmental contaminants. At temperatures of engine operation, adherence of these environmental contaminants on the engine part form molten compositions on the surfaces of the engine parts. As a result, chemical and mechanical interactions occur between the environmental contaminant compositions and the engine parts. The molten contaminant compositions can infiltrate pores and openings in the engine parts, that lead to cracks and possible part failure.

Some environmental contaminant compositions that deposit on engine parts contain oxides of calcium, magnesium, aluminum, silicon, and mixtures thereof. These oxides combine to form contaminant compositions comprising calcium-magnesium-aluminum-silicon-oxide systems (Ca—Mg—Al—Si—O), herein referred to as CMAS. Damage occurs when the molten CMAS infiltrates engine parts. Still other contaminants may include iron and nickel oxides, sodium vanadates, sodium sulfates, sodium phosphates, and the like. Some of these contaminants originate from marine environments, such as engines operating at offshore sites.

Repair of turbine engine parts involves cleaning cracks, crevices, and surfaces so that there is complete removal of CMAS and other oxides, organic and inorganic impurities, and dirt prior to alloy filling and brazing. Presently, fluoride ion cleaning (FIC) or etching is used to clean the surfaces of engine parts, including shallow cracks. Fluoride ion cleaning/etching techniques require high temperatures, about 1900° F., and several hours for processing. In addition, hydrogen fluoride is used in fluoride ion cleaning and is listed as a hazardous air pollutant under the Clean Air Act, Section 112(b). As a result, processes using hydrogen fluoride may be subject to a Maximum Available Control Technology (MACT) standard. Another drawback of fluoride ion cleaning is that it is not effective for cleaning deep and tortuous cracks. In addition, a further deficiency of FIC is that on parts where an overlay layer is used, for example, a nickel-aluminide or platinum-aluminide, fluoride ion cleaning attacks the overlay layer that is deposited on the metal substrate. Thus, there is a need for a process that operates at lower temperatures in shorter time and utilizes chemicals that are compatible and safe with the environment without damaging the overlay layer or bond coat. Further, there is a need for a cleaning process of turbine engine parts that can effectively clean deep cracks and crevices.

SUMMARY OF THE INVENTION

This invention is directed to a wet chemical process for cleaning oxides from cracks and surfaces of airfoils before repairing the airfoils which comprises exposing surfaces and cracks of airfoils to an admixture of an organic solvent, a base, and water in an autoclave at a temperature and pressure sufficient to lower the surface tension of the admixture for a period of time to completely remove all oxides from the surfaces and cracks of the airfoils. The term "airfoil" herein means turbine parts such as blades, buckets, nozzles, combustion chamber liners, vanes, and the like.

This invention also provides a method for removing surface oxides, dirt, and organic impurities from flat, contoured, and cracked surfaces of turbine parts comprising the step of: treating the turbine parts in an autoclave with an organic caustic solution at a temperature, a pressure, and a time sufficient to completely remove the surface oxides, dirt, and organic impurities from the turbine parts' surfaces and cracks without damaging an underlying metallic layer or a metallic substrate surface.

During the process it is beneficial, but not necessary, if the organic component of the organic caustic solution acts as a supercritical fluid. By supercritical fluid it is meant that the liquid is above its critical temperature and pressure where the surface tension of the organic solution is near or about zero.

Organic caustic solutions comprise chemical admixtures of an organic compound, such as an alcohol, a basic compound, such as an hydroxide base, and water. The ratio of base to water may be about one to one (1:1), or fifty weight percent base in water. The organic compound, generally a solvent to reduce surface tension of the solution, such as ethanol, must be present in a sufficient amount to cause all of the oxide to be removed from the treated part.

An advantage of the invention is that the underlying metallic layer and the substrate of the airfoil are not damaged, which allows multiple repairs to the airfoil. This is a substantial savings in refurbishing time and costs. Another advantage of the invention is that compared to fluoride ion cleaning, the organic caustic treatment is conducted at lower temperatures, for instance 480° F. versus 1900° F. Also, the fluoride ion cleaning process uses and discards a hazardous chemical, hydrogen fluoride vapors, whereas, the organic caustic treatment of this invention is conducted in a closed system and the chemicals are recyclable. Still another advantage of this invention is that the organic caustic treatment cleans deep, tortuous cracks.

DESCRIPTION OF THE INVENTION

Figure 1A:
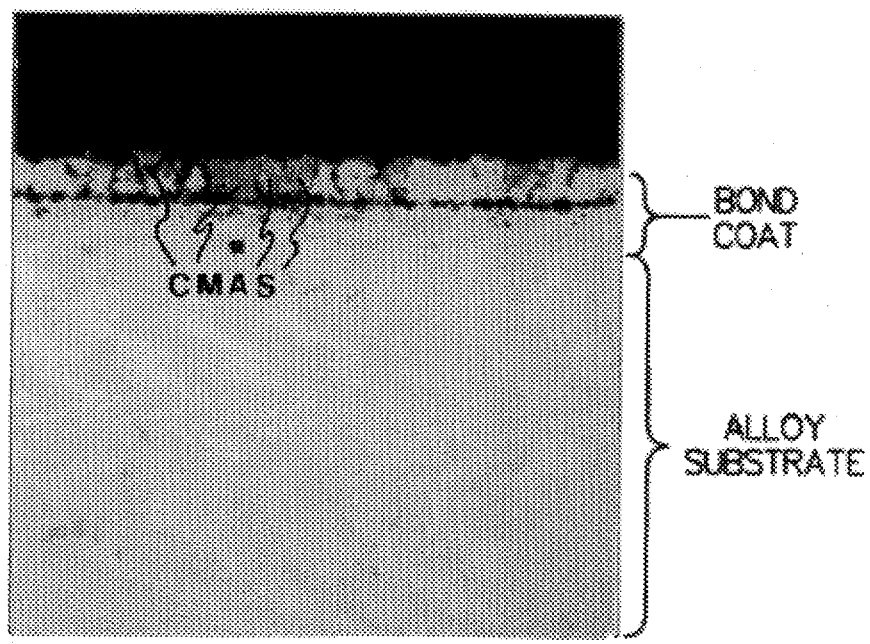
FIGS. 1a and 1b are photo micrographs of a cross section of leading edge of a blade with CMAS-type contamination (calcium-magnesium-aluminum-silicon-oxides) in FIG. 1a and after CMAS removal in FIG. 1b, where black areas represent epoxy, white areas represent metal alloy formulations, and dark gray areas represent metal oxides.

The invention is directed towards a wet chemical process for removing oxides, dirt, and organic impurities during repair of airfoils without damaging or effecting surface bond coats or base metal substrates of the airfoils. The process is especially suited for cleaning deep, tortuous cracks in the airfoils prior to brazing or alloying repair operations. The process entails using an autoclave with an organic caustic solution to fully remove the unwanted oxides, dirt, and organic impurities. Dirt includes sand, volcanic ash, fly ash, cement, runway dust, substrate impurities, fuel and air sources, oxidation products from engine components, and the like. Oxides are also included as dirt, and may derive from environmental contaminants that adhere to the airfoil surface during service use, such as CMAS or calcium-magnesium-aluminum-silicon-oxide mixtures. In addition to CMAS, other oxides can also be removed from airfoil surfaces by the method of this invention. These oxides include, but are not limited to, oxides of magnesium, calcium, aluminum, silicon, chromium, iron, nickel, barium, titanium, alkali metals, and mixtures thereof. Other contaminants include vanadates, sulfates, and phosphates of alkali metals.

Bond coats and overlay layers are usually metallic compositions, including platinum-aluminum, aluminum, aluminum-nickel, nickel-chromium-aluminum-yttrium, iron-chromium-aluminum-yttrium, cobalt-chromium-aluminum-yttrium, nickel-cobalt-chromium-aluminum-yttrium, and the like.

Substrate materials often used in turbine parts or airfoils for aircraft engines and power generation equipment may include nickel, chromium, or iron based superalloys. The alloys may be cast or wrought superalloys. Examples of such substrates are GTD-111, GTD-222, Rene 80, Rene 41, Rene 125, Rene 77, Rene 95, Inconel 706, Inconel 718, Inconel 625, cobalt-based HS188, cobalt-based L-605, and stainless steels. The process is suited for parts and hardware used in turbines or on airfoils. An example of a turbine part would be a turbine blade or vane. The term airfoil refers also to turbine parts, such as blades, vanes, buckets, nozzles, and the like.

Additional substrate materials may be used in this invention. For instance, it is also contemplated that this invention may be utilized for removal of oxides, dirt, and organic and inorganic impurities in marine environments, electronic applications, and power generators, such as gas, steam, and nuclear, to mention a few.

The autoclave reactor is a pressure vessel and is built to withstand high pressures at high temperatures. Pressure in the system is elevated by heating the contents (reaction mixture) in the autoclave or by using an external source of compressed gases to overpressurize the vessel. The autoclave may be operated in batch fashion; that is, the ingredients of the caustic organic solution are charged, the unit is closed, and the charge is brought to the desired conditions of temperature and pressure. Continuous or semicontinuous operation can be undertaken if one or more of the reactants are continuously fed and products withdrawn.

In the autoclave, the temperature and pressure that is applied may cause the organic component of the organic caustic solution to become a supercritical fluid or have properties similar to that of a supercritical fluid. By supercritical fluid it is meant that the surface tension of the fluid is zero or approaches near zero which completely wets the surfaces in contact. The organic caustic solution does not have to be a supercritical fluid for the oxide or dirt to be removed. However, if the organic component of the organic caustic solution is near or approaches a supercritical state in the autoclave reactor during treatment of the airfoil, the surface tension is dramatically reduced thus enhancing the activity of the organic caustic solution and its wettability towards fine cracks and pores.

The organic caustic solution is generally an admixture of an organic compound, a base, and water. Other admixtures may also be used, such as acetone, liquid ammonia, or liquid carbon dioxide, provided they dramatically lower the surface tension of the fluid during treatment of the airfoil in the autoclave. Examples of organic compounds are alcohols, such as methanol, ethanol, propanol, isopropyl alcohol, and acetone and liquid carbon dioxide, liquid ammonia, and mixtures thereof. Examples of caustic compounds are sodium hydroxide, potassium hydroxide, ammonium hydroxide, lithium hydroxide, triethylamine (TEA), tetramethylammonium hydroxide (TMAH), and mixtures thereof. Use of additives, such as surfactants and chelates, to further reduce the surface tension of the caustic solution can be beneficial.

The caustic compound (the base) and water may be present in about a one to one ratio. The concentrations of the bases may range from very dilute, about one weight percent, to very concentrated, about sixty-five weight percent. The organic compound is usually present in a sufficient amount as a solvent media for the caustic solution to fully clean the alloy surfaces. The amount also depends on the size of the autoclave reactor and the size of the part being processed. Commonly known engineering principles can be used to calculate various amounts of the organic compound that is sufficient with the caustic and water to remove the oxide or dirt. Generally, the base is about 1–65 weight percent, the water is about 1–35 weight percent, and the organic compound is about 1–98 weight percent. A preferred weight percent for the caustic organic solution is about 6 weight percent base, 6 weight percent water, and about 88 weight percent organic compound.

The temperature and pressure that is used during treatment can vary, depending on the amount and the type of oxides and dirt to be removed and the capabilities of the autoclave reactor. The organic caustic treatment can be performed at a range of temperatures, pressures, and reaction times. For example, the treatment may involve combinations of ultrasonication and boiling with autoclave treatment. The autoclave treatment can be conducted under several conditions. For instance, the pressure can range from about 100 pounds per square inch to about 3000 pounds per square inch, and the temperature can range from about 150° C. to 250° C. Higher pressures and temperatures can be applied to achieve shorter process times. Also, pressurization can be achieved at room temperature using compressed gases. Still yet, the process can start with zero pressure and by increasing the temperature of the reaction mixture, the autoclave pressure automatically rises resulting from the increase in the vapor pressure of the reaction mixture. The time to remove the oxides and dirt depends on the amount to be removed and the temperature and pressure conditions that are applied. Usually, the time is between about 0.1 to 8.0 hours. Also, it should be noted that using a mixer, such as a mechanical stirrer, a magnetic stirrer, or an ultrasonicator, at low pressures or high pressures may enhance the ability of the organic caustic solution to remove the oxides and dirt in torcherous locations and in shorter duration of time.

An example of one of the organic caustic autoclave treatments for cleaning airfoil samples is now described for purposes of demonstrating the invention, and does not limit the invention to only this one treatment or set of conditions.

EXAMPLES

Example 1

A CFM6-80C2 blade (airfoil) with desert dust, herein referred to as CMAS (calcium-magnesium-aluminum-silicon-oxides) was cleaned by the organic caustic autoclave method of this invention. The blade was placed in a Monel autoclave and submerged in a solution containing twenty grams of sodium hydroxide, twenty grams of water, and 330 milliliters of ethanol. After sealing the pressure vessel, the temperature was raised to 250° C. with a resultant increase in pressure to 2000 pounds per square inch. The temperature and pressure conditions were maintained for approximately one hour. After the autoclave was cooled, the sample was removed and cleaned (sonicated) in a three step process, including water cleaning, acid neutralization (5 weight percent hydrochloric acid solution) of base, followed by water cleaning.

Figure 1B:
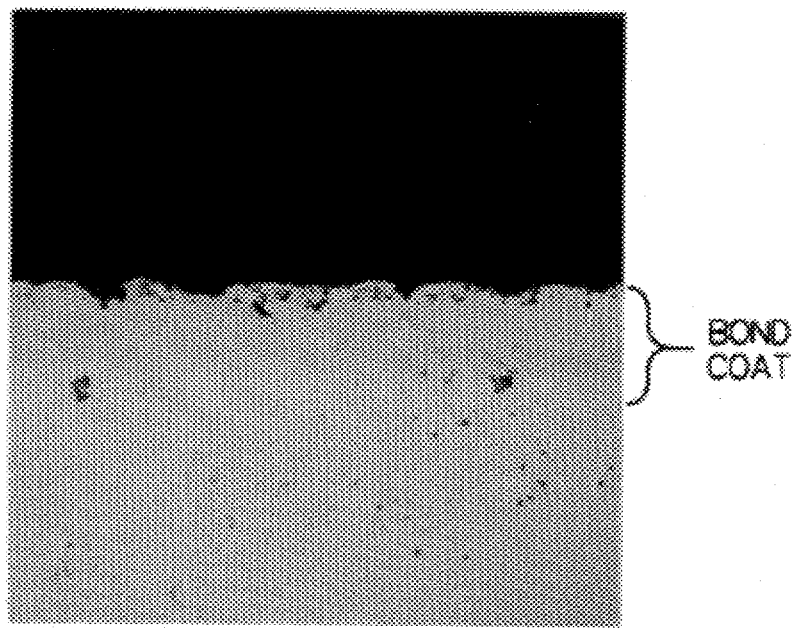

The CMAS was removed from the blade showing a weight loss of 389 milligrams. Optical microscopy of the various sections of the CFM6-80C2 blade indicated complete removal of oxides from the surface and in the cracks. Optical micrographs of the cross section of a leading edge of the blade with CMAS (FIG. 1a) and after CMAS removal (FIG. 1b) are shown in FIG. 1.

Example 2

A CFM6-6 twin blade with a thermal barrier coating (8 weight percent yttria stabilized 92 weight percent zirconia) and CMAS (calcium-magnesium-aluminum-silicon-oxides) was cleaned in addition to removing the thermal barrier coating by the organic caustic autoclave method of this invention. The blade was placed in a Monel autoclave and submerged in a solution containing twenty grams of sodium hydroxide, twenty grams of water, and 330 milliliters of ethanol. After sealing the pressure vessel, the temperature was raised to 250° C. with a resultant increase in pressure to 2000 pounds per square inch. The temperature and pressure conditions were maintained for approximately one hour. After the autoclave was cooled, the sample was removed and cleaned (sonicated) in a three step process, including water cleaning, acid neutralization (5 weight percent hydrochloric acid solution) of base, followed by water cleaning.

The TBC and CMAS were removed from the blade showing a weight loss of 989 milligrams and 389 milligrams, respectively. Optical microscopy of the various sections of the CFM6-80C2 blade indicated complete removal of TBC and CMAS oxides from the surface and in the cracks.

What is claimed:

1. A wet chemical process for cleaning cracks and surfaces of airfoils before repairing the airfoils which comprises exposing surfaces and cracks of airfoils to an organic caustic admixture consisting essentially of an organic solvent selected from the group consisting of methanol, ethanol, propanol, isopropyl alcohol, acetone, liquid carbon dioxide, liquid ammonia, and mixtures thereof, a base, and water, where the organic caustic admixture is about 1–98 weight percent organic solvent, about 1–65 weight percent base, and about 1–35 weight percent water, in an autoclave at a temperature and pressure sufficient to lower the surface tension of the admixture to about zero for a period of time sufficient to completely remove all oxides from the surfaces and cracks of the airfoils.

2. A process according to claim 1 where the base is selected from the group consisting of sodium hydroxide, potassium hydroxide, ammonium hydroxide, lithium hydroxide, triethylamine (TEA), tetramethylammonium hydroxide (TMAH), and mixtures thereof.

3. A process according to claim 1 where the organic solvent approaches a supercritical fluid state during the cleaning of the airfoil in the autoclave.

4. A process according to claim 1 where the airfoil is a turbine part.

5. A process according to claim 4 where the turbine part is selected from the group consisting of blades, buckets, nozzles, combustion chamber liners, and vanes.

6. A process according to claim 1 where the pressure is between about 100 psi to 3000 psi, where the temperature is between about 150°–250° C., and where the time is between about 0.1–8.0 hours.

7. A method for removing surface oxides, dirt, and organic impurities from flat, contoured, and cracked surfaces of turbine parts comprising the step of: treating the turbine parts in an autoclave with an organic caustic solution, where the organic caustic solution comprises an organic solvent, a base, and water, where the organic solvent is selected from the group consisting of methanol, ethanol, propanol, isopropyl alcohol, acetone, liquid carbon dioxide, liquid ammonia, and mixtures thereof, and where the organic caustic solution is about 1–98 weight percent organic solvent, about 1–65 weight percent base, and about 1–35 weight percent water, at a temperature, a pressure, and a time sufficient to completely remove the surface oxides, dirt, alkali salts, and organic impurities from the turbine parts' surfaces and cracks without damaging an underlying metallic bond coat, where the bond coat is a metal composition selected from the group consisting of platinum-aluminum, aluminum, aluminum-nickel, nickel-chromium-aluminum-yttrium, iron-chromium-aluminum-yttrium, cobalt-chromium-aluminum-yttrium, nickel-cobalt-chromium-aluminum-yttrium, and mixtures thereof or a metallic substrate surface, where the substrate is a nickel, chromium, or iron based superalloy or stainless steel, where the pressure is between about 100 psi to 3000 psi, where the temperature is between about 150°–250° C., and where the time is between about 0.1–8.0 hours.

* * * * *